United States Patent [19]

Roposh

[11] Patent Number: 5,396,494
[45] Date of Patent: Mar. 7, 1995

[54] METHOD FOR OPERATING AN ASYNCHRONOUS PACKET BUS FOR TRANSMISSION OF ASYNCHRONOUS AND ISOCHRONOUS INFORMATION

[75] Inventor: Ronald C. Roposh, Flemington, N.J.

[73] Assignee: AT&T Corp., Murray Hill, N.J.

[21] Appl. No.: 37,832

[22] Filed: Mar. 25, 1993

Related U.S. Application Data

[63] Continuation of Ser. No. 724,255, Jul. 1, 1991, abandoned.

[51] Int. Cl.$^6$ ............................................. H04J 3/02
[52] U.S. Cl. ................................. 370/85.2; 370/85.6; 370/85.9; 340/825.51
[58] Field of Search .................... 370/60.1, 85.6, 85.7, 370/85.2, 94.1, 94.2, 85.9, 85.11; 340/825.5, 825.51

[56] References Cited

U.S. PATENT DOCUMENTS

| | | | |
|---|---|---|---|
| 4,586,175 | 4/1986 | Bedard et al. | 370/85 |
| 4,593,282 | 6/1986 | Acampora et al. | 370/79 |
| 4,733,390 | 3/1988 | Shirakawa et al. | 370/85.7 |
| 4,764,920 | 8/1988 | Furuya | 370/85.7 |

OTHER PUBLICATIONS

IEEE Communications Magazine, vol. 27, No. 4, Apr. 1989, "AT&T's New Approach to the Synchronization of Telecommunication Networks", J. E. Abate et al, pp. 35–45.

Primary Examiner—Douglas W. Olms
Assistant Examiner—Min Jung
Attorney, Agent, or Firm—Frederick B. Luludis

[57] ABSTRACT

A facility is provided for operating an asynchronous packet transmit bus such that isochronous information packets may be transmitted from a source to a destination with a fixed, constant delay. The fixed, constant delay is achieved by employing a bandwidth management bus and assigning to port modules which contend for access to the transmit bus respective levels of priority, in which the highest level of priority is associated with isochronous information and in which lower levels of priority are associated with other types of information, such as asynchronous information. In addition, each port module which transmits isochronous information is assigned at least one time slot of each frame of time slots. In this way, a port module that needs to transmit isochronous information is granted access to the transmit bus during its assigned time slot if the module asserts such highest level of priority in response to its address being transmitted over the bandwidth management bus. If the module fails to assert such priority, then the time slot is marked for open contention, thereby allowing the other port modules to contend for access to the transmit bus during that time slot.

21 Claims, 3 Drawing Sheets

FIG. 2

| | 0 | 1 | 2 | 3 | 4 | 5 | 6 | 7 | 8 | 9 | 10 | 11 | 12 | --- | 21 | --- | 41 | --- | 56 |
|---|---|---|---|---|---|---|---|---|---|---|---|---|---|---|---|---|---|---|---|
| | 1 | 4 | 4 | 4 | 6 | 0 | 7 | 11 | 11 | 15 | 15 | 18 | 15 | --- | 18 | --- | 0 | --- | 0 | 105-1 |

FIG. 3

| | 0 | 1 | 2 | 3 | 4 | 5 | 6 | 7 | 8 | 9 | 10 | 11 | 12 | --- | 21 | --- | 41 | --- | 56 | |
|---|---|---|---|---|---|---|---|---|---|---|---|---|---|---|---|---|---|---|---|---|
| 1 | 1 | 15 | --- | --- | --- | --- | --- | --- | --- | 15 | --- | --- | 15 | --- | --- | --- | --- | --- | 0 | 105-2 |
| | 1 | 15 | --- | --- | --- | --- | --- | --- | --- | 15 | --- | --- | 15 | --- | --- | --- | --- | --- | 0 | 105-3 |
| | 1 | 15 | --- | --- | --- | --- | --- | --- | --- | 15 | --- | --- | 15 | --- | --- | --- | --- | --- | 0 | 105-4 |
| | | | | | | | | | | | | | | | | | | | | |
| | 1 | 15 | --- | --- | --- | --- | --- | --- | --- | 15 | --- | --- | 15 | --- | --- | --- | --- | --- | 0 | 105-11 |
| | | | | | | | | | | | | | | | | | | | | |
| 24 | | 15 | --- | --- | --- | --- | --- | --- | --- | 15 | --- | --- | 15 | --- | --- | --- | --- | --- | 0 | 105-25 |

METHOD FOR OPERATING AN ASYNCHRONOUS PACKET BUS FOR TRANSMISSION OF ASYNCHRONOUS AND ISOCHRONOUS INFORMATION

This is a continuation of application Ser. No. 07/724,255, filed on Jul. 1, 1991, now abandoned.

BACKGROUND OF THE INVENTION

Synchronous data characterizing, for example, voice or video signals, is typically transmitted from a source to a receiver via a particular type of connection commonly referred to as a circuit switched connection. Typically, a circuit switched connection is a dedicated connection between the source and receiver. The reason for requiring a circuit switched connection for the transmission of synchronous data is to ensure that the data is delivered to the receiver at an expected rate. If the circuit switched connection imposes a delay in the delivery of the data, then the delay needs to be a constant fixed amount of time between each transmission of the data. In the ideal situation the fixed delay would be very close to zero seconds.

In contrast to the circuit switched connection is the so-called packet switched connection. A packet switched connection is typically used to transmit data that is not time sensitive, such as asynchronous data. If a packet switch were used to transmit synchronous data, then it is likely that the constant fixed delay that is needed between each transmission of such data packets could not be met. In such a situation, a packet receiver which fails to receive an expected synchronous data packet may supply to an intended destination a random value, such as a null word, for the expected synchronous data. In such an instance the random value could cause the intended destination to perform an unintended function. For example, if the intended destination is a telephone station set, then the station set might decode the random value into a signal characterizing either a "clik" or "pop". As a further example, if the intended destination is a video receiver, then the video receiver could decode the random value into an incorrect video image.

SUMMARY OF THE INVENTION

The problem of transporting synchronous data via a packet switched connection is obviated by employing in a packet switched network a bandwidth management system operable for managing the transmission of both synchronous and asynchronous data such that network delay in transporting such data is constant.

Specifically, such bandwidth management is obtained in accord with the invention by assigning to a port module of a packet switch one of a number of levels of priority based on the type of data, asynchronous or synchronous, that the module transports. In an illustrative embodiment of the invention, the highest level of priority is assigned to synchronous (i.e., isochronous) data. In addition, a port module that is assigned the highest level of priority is also associated with at least one time slot of each frame of time slots. Thereafter, during a predetermined time slot, e.g., a time slot which precedes the port module's associated time slot, an address identifying the port module is transmitted over a packet switch bandwidth management bus. Access to a transmit bus is then granted to the port module during the associated time slot if the port module asserts such highest level of priority. If the port module does not so assert, then the associated time slot is marked for open contention, thereby allowing other port modules to contend for that time slot.

BRIEF DESCRIPTION OF THE DRAWINGS

In the drawing:

FIG. 2 is an illustrative example of a table that may be used for tracking, in accord with the principles of the invention, the allocation of individual time slots of a frame of time slots to respective ones of the port modules of FIG. 1;

FIG. 3 is an expanded version of the table of FIG. 2; and

DETAILED DESCRIPTION

Figure 1:
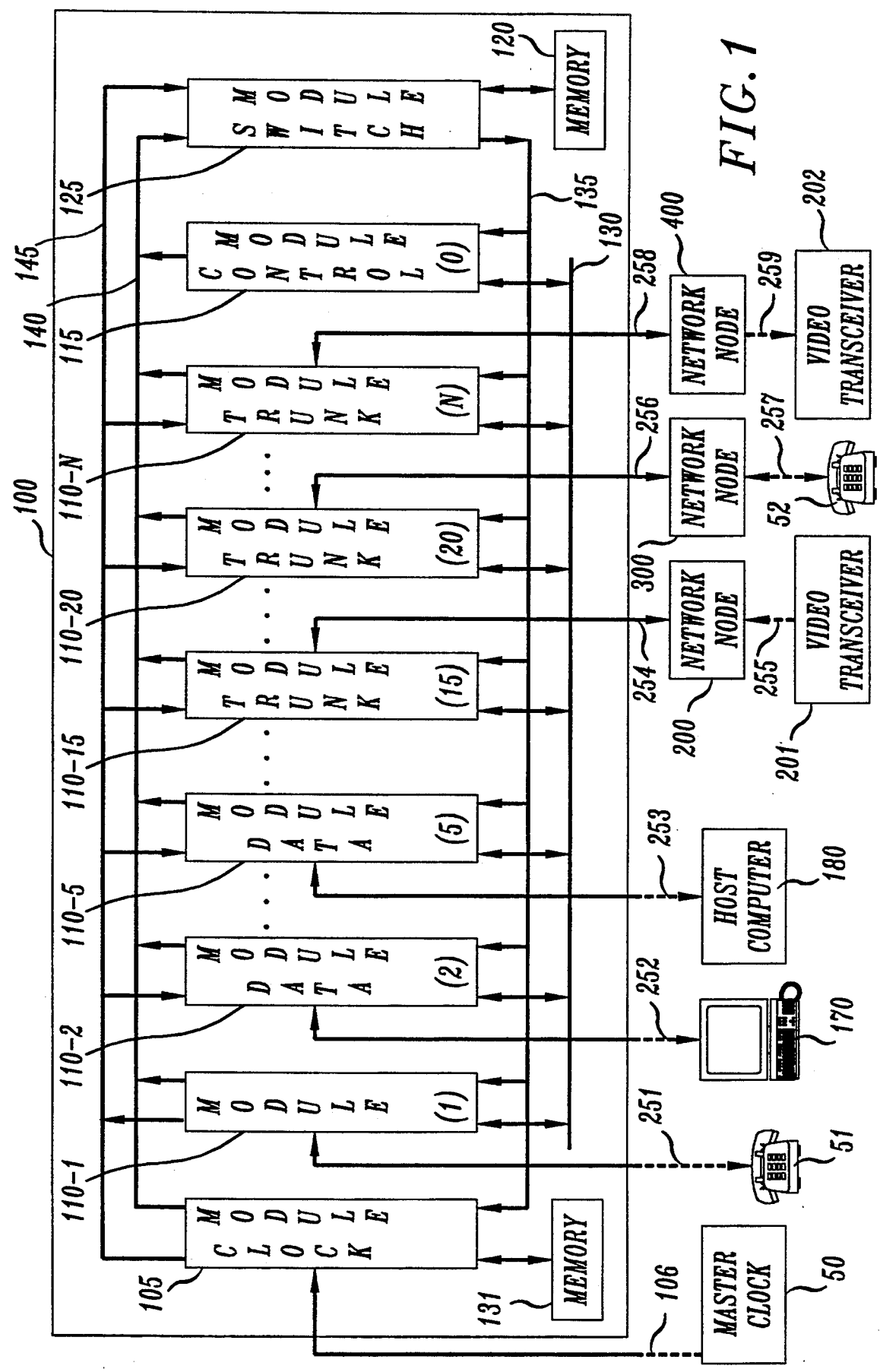
FIG. 1 is a broad block diagram of a network of nodes, in which one of the nodes is shown in more detail and is arranged to implement the principles of the invention.

FIG. 1 shows a broad block diagram of a communications network node 100 arranged, in accordance with the invention, to transmit synchronous and asynchronous information packets. Node 100 is commonly referred to as a virtual circuit switch and includes a so-called printed wire backplane equipped with connectors (not shown) for respectively receiving clock module 105, circuit (port) modules 110-1 through 110-N, control module 115 and switch module 125. In an illustrative embodiment of the invention, such modules are identified by respective addresses that are implemented (hard wired) in the connectors into which the modules are inserted. Thus, a module that is inserted into a connector assumes the address of its associated connector. The module then exchanges with control module 115 a number of messages. Such messages include, for example, the identity (address) of the newly inserted module and the types of data services (e.g., synchronous, asynchronous and/or so-called isochronous) that the module performs as well as the level of transmission activity associated with each such service.

In response to the exchange of such messages, control module 115 assigns to the newly inserted module a number of contiguous locations in memory 120, in which the number is based on the function(s) (service(s)) that the module performs. In addition, control module 115 sends to clock module 105 via broadcast bus 135 a message identifying the various services and levels thereof that are handled by the newly inserted module. If such services include the transmission of isochronous data, then clock module 105, in accord with the invention, allocates to the newly inserted module a portion of the transmit bus 140 bandwidth for the transmission of such data, as will be discussed below in detail.

The printed wire backplane also implements a number a busses each connecting to the aforementioned connectors. Such busses include contention bus 130, broadcast bus 135, transmit bus 140, and bandwidth management bus 145. A port module, e.g., module 110-15, that is inserted into an available backplane connector is automatically connected to each of the busses, in which contention bus 130 provides a method for the modules to contend for access to transmit bus 140 and supports eight priority levels of contention with group arbitration (i.e., so-called round robin arbitration) within each level. In this way a port module. e.g., module 110-15, may contend for control of bus 140 to send to another module, e.g., module 110-20, a message segment.

A module 110 contends for access to transmit bus 140 by placing on bus 130 its associated address and priority level. The module 110 then reads the address portion and priority level portion of bus 130. If the value of the priority level read from that bus is greater than the value of the priority level asserted by the module 110 then that module terminates its contention for transmit bus 110 on the basis that another module 110 having a higher priority level is also contending for access to transmit bus 140. Accordingly, access to bus 110 would be granted to the other module 110. A contending module 110 also terminates its contention for access to transmit bus 140 if it finds that its asserted priority level is equal to the priority level that is read from bus 130, but its address is less than the read address. In this instance, a so-called Group contention mode would be invoked in which the latter module 110 and other module(s) 110 that are asserting the same level of priority would be queued for access to bus 140. In an illustrative embodiment of the invention, contention bus 130 includes a Group lead which is activated whenever the group mode is invoked. Such activation inhibits during so-called open contention periods (slots) other ones of the modules 110-01 through 110-N from contending for access to transmit bus 140 until each of the group of queued modules 110 has been granted access to bus 110 based on the order of their respective addresses. That is, of the queued modules 110 access to bus 140 is granted first to the module 110 having the highest address, and then to the module having the next highest address, and so on. When the last of the queued modules 110 has been granted access to bus 140, then the Group lead is deactivated, thereby allowing all of the modules 110-1 through 110-N to contend for access to transmit bus 140.

It is apparent from the foregoing that a module 110 having a relatively high priority level and address could dominate the contention process for open time periods. To prevent such domination, each module 110 includes a register (not shown) for controlling the number of times that its associated module may access bus 140 during open periods of a respective time frame. That is, when the module 110 is inserted in a respective one of the aforementioned connectors and, as result thereof, has communicated with control module 115, as mentioned above, clock module 105 at the direction of module 115 causes a value, e.g., a value of three, to be stored in the register associated with the inserted module 110. Accordingly, the inserted module 110 will be permitted access to bus 140 for a maximum of three of the open contention periods of a respective time frame. After the third such access, the register associated with the inserted module 110 prevents the module from contending for any remaining open contention periods of the respective time frame.

When module 110 is granted access to transmit bus 140, the module may then transmit a message segment. Such a message segment typically contains, inter alia, the address of the sending module as well as an assigned channel number. Switch module 125 responsive to receipt of the message segment via bus 140 instantiates a virtual circuit connection between the source and destination using translation memory 120 to translate the source address and channel number into a destination address and channel number. Switch 125 then transmits the revised message to the node modules 110 via broadcast bus 135. Each of the node modules 110 monitors and removes from bus 135 message segments containing their respective addresses.

(The notion of establishing a virtual circuit connection using a switch module and translation memory is presently employed in the Datakit virtual circuit switch available from AT&T.)

Included in the various services provided by modules 110-1 through 110-N are connection oriented and connectionless data services. A connection oriented message is a message segment that is transported via a virtual circuit connection established between a pair modules using translation memory 120. A connectionless message is a message segment that is transported on the "fly" via a pre-established quasi virtual circuit connection, in which the address of the originator is translated into an address that is common to each node module 110-1 through 110-N that participates in connectionless data services. Thus, each such module 110 also removes from broadcast bus 135 messages bearing the common address and then determines from information contained in the message whether or not it is the intended recipient.

As mentioned above, synchronous data service also includes a so-called isochronous, or pseudosynchronous, data service. Isochronous data service is a service that requires a fixed bandwidth with a constant amount of delay through a network, which means that each of a series of isochronous packets, such as packets containing voice or video data, transmitted by an origination module to a destination module has to be transported through the network, or an associated node, with a constant fixed amount of delay. Such a fixed delay is achieved, in accord with the invention, by employing bandwidth management to control the allocation of the bandwidth of transmit bus 140 on a priority basis, in which the isochronous service is afforded the highest level of priority.

In particular, such bandwidth management operates under the control of clock module 105, which is synchronized with a master clock 50 common to each network node. Such a master clock may be, for example, the so-called stratum one clock employed in the AT&T network, in which the stratum one clock signal is divided down into a so-called stratum two clock signal, which is then divided down into a so-called stratum three clock signal, an so on. (The way in which various stratum clock signals are distributed in a network is disclosed in *IEEE Communications Magazine*, Vol. 27, No. 4, 1989, "AT&T's New Approach to the Synchronization of Telecommunication Networks", J. E. Abate, et al., which is hereby incorporated by reference). In an illustrative embodiment of the invention, lead 106 supplies to clock module 105 a predetermined one of the stratum clock signals, e.g., a stratum four clock signal having an 8 kHz data rate. As is well-known, a T1 carrier transmission facility is one source of a stratum four clock signal, which is represented herein by lead 106.

It is also well-known that an 8 kHz clock signal corresponds to a 125 microsecond time period. In an illustrative embodiment of the invention, the bandwidth of transmit and broadcast busses 140 and 135 are segmented into time frames, each having a duration of 125 microseconds, in which the beginning of each time frame is synchronized with the stratum four clock signal. In addition, each time frame is divided into a plurality of time slots, or cells,—illustratively 57 time slots, as will be discussed below.

Thus, in accord with an illustrative embodiment of the invention, clock module 105 allocates among the various modules 110-1 though 110-N that transmit isochronous data a number of time slots of each time frame, of time slots. However, if a module, e.g., module 110-2 or 110-5, transmits lower priority data only, such as asynchronous data, then clock module 105 does not allocate to the lower priority data module a portion of the transmit bus 140 bandwidth. In that event then, the lower priority data module contends for access to transmit bus 140 during open contention periods, or time slots, in the manner discussed above.

To track the way in which it allocates such time slots, and thus the bandwidth of transmit bus 140, clock module 105 maintains in associated memory 131 a bandwidth allocation table, an example of which is shown in FIG. 2. Table 105-1 comprises a plurality of fields—illustratively 57 fields (0 through 56)—each corresponding with a bus 140 time slot. It is seen from FIG. 2 that clock module 105 has inserted in particular ones of the fields of table 105-1 the addresses of respective ones of the modules 110-1 though 110-N that transmit isochronous data. For example, clock module 105 has allocated to module 110-1 time slot zero and has allocated to module 110-4 time slots one, two and three, and so on. The time slots that are allocated to a particular module 110 may or may not be contiguous to one another, as is shown for modules 110-15 and 110-18. It is seen from table 105-1 that clock module 105 has also assigned a number of time slots, e.g., fields 41 through 59, to address zero (0). In an illustrative embodiment of the invention, address zero (0) is assigned to switch module 125 and is used to define an open contention period for all modules 110 that contend for use of transmit bus 140, as will be discussed below.

Specifically, during each time slot of each frame of time slots clock module 105, in accord with the invention, transmits over bandwidth management bus 145 the address that is contained in the table 105-1 field having an address that next succeeds (i.e., is greater by a value of one) the address of the current time slot. For example, during time slot six of a current frame of time slots clock module 105 transmits over bandwidth management bus 145 the contents of field seven (7) of table 105-1, thereby allocating time slot seven (7), and thus access to transmit bus 140, to the module whose address is eleven (11). As a further example, during time slot 56 of a current frame of time slots clock module 105 transmits over bandwidth management bus 145 the contents of field zero (0) of table 105-1, thereby allocating time slot zero of the next time frame, and thus access to transmit bus, to the module whose address is one (1), namely module 110-1. However, such allocation does not grant to that module control of transmit bus 140. To obtain such control, a module that recognizes that its address is being transmitted on bus 145 must then assert its priority level on contention bus 130. As mentioned above, isochronous data is assigned the highest level of priority, which is identified herein by a predetermined value, for example, a binary value of 111. Thus, during time slot 56 module 110-1 must assert the latter value over contention bus 130. A module 110 that asserts over bus 130 the highest level of priority at the time that its address is being transmitted over bandwidth management bus 145 effectively prevents other modules 110 from asserting the same priority level.

Upon gaining such access, or control, module 110-1 may then transmit an isochronous message segment (or data packet) over transmit bus 140 for delivery to switch module 120 and thence to a destination module, e.g., module 110-20, via a priorly established virtual circuit connection. In the event that module 110-1 does not have an isochronous message segment to transmit, then it does not assert on contention bus 130 its assigned priority level. In that event then, control of transmit bus 140 for the next time slot is granted to one of the other contending modules 110 asserting the next highest level of priority, e.g., a binary value 110. If more than one such contending module 110 asserts the next highest level of priority, then the group contention mode is activated, in the manner discussed above.

At the start of the first time slot (i.e., time slot zero) of the next current frame of time slots, clock module transmits over bandwidth management bus 145 the contents of field one (1), which defines an address of four assigned to module 110-4. Similarly, to gain control of transmit bus 140, module 110-4 upon recognizing that its address is being transmitted over bus 145 must assert over contention bus 130 its highest level of priority (i.e., a binary value of 111). As mentioned above, if module 110-4 does not have an isochronous message segment to transmit, then it does not assert over bus 130 the associated level of priority, thereby freeing the next time slot (i.e., time slot one) for open contention.

It is seen from the FIG. 2, that the address assigned to module 110-4 is also stored in fields 2 and 3 of table 105-1. Thus, in the manner described above, clock module 105 at the start of time slots 1 and 2 would transmit over bandwidth management bus 145 address 4, thereby extending to module 110-4, in the manner discussed above, the option of gaining control of transmit bus 140 during time slots 2 and 3. Similarly, for time slots 3 through 12, and so on, clock module 105 would transmit over bandwidth management bus 145 the contents of the corresponding next succeeding fields of table 105-1, thereby extending to the module 110 whose address is identified by such contents the option of gaining control of transmit bus 140. Thus, during, for example, time slot 5, clock module 105, in accord with the contents of corresponding field 6 of table 105-1, extends to modules 110-5 the aforementioned option.

It is also seen from the Figure that the contents of field 5 defines address zero (0), which, as mentioned above, defines a free, or open, time slot (period), one in which modules 110-1 through 110-N may freely contend for control of transmit bus 140. Thus, during time slot 4, clock module 105 would transmit over bandwidth management bus 145 the contents of the corresponding field 5 of table 105-1. The modules 110-1 through 110-N as a result of monitoring the latter bus would recognize that address zero defines open contention and thus those modules requiring control of transmit bus 140 would assert on contention bus 130 their respective levels of priority and addresses, in the manner discussed above.

In accord with an aspect of the invention, a module 110 that is arranged to process, for example, asynchronous data, may, nevertheless, be assigned the level of priority that is accorded to isochronous data, i.e. the highest level of priority. In such an instance then, the address that is assigned to such a module, e.g., module 110-2, would be inserted in one or more fields of table 105-1, thereby guaranteeing that that module would gain control of transmit bus 140 for one or more time slots of a time frame. In addition, a module, may be assigned a number of different levels of priority each associated with respective types of data that the module processes. For example, module 110-15 is a trunk module which interfaces packet switch, or node, 100 with packet switch, or node, 300. Such a module typically processes a number of different types of data services, such as isochronous and asynchronous, in which the latter data service may include data associated with the aforementioned connection oriented and connectionless data services. Therefore, for each such service module 110-15 would be assigned a respective level of priority.

In an illustrative embodiment of the invention, the use of a bandwidth allocation table, such as as table 105-1, may be implemented in a way that it advantageously serves different ones of well-known data rates transmitted in accord with a particular data transmission standard. Such data rates may be, for example, the well-known DS1 and DS3 data rates, which, as is well-known, respectively define data rates of 1.544 Mb/s and 44.736 Mb/s. Such a transmission standard may be, for example, the well-known IEEE standard 802.6 for Metropolitan Area Networks. (The 802.6 standard is disclosed in publication number P802.61D6, dated Jul. 13, 1990, entitled Proposed Standard-Distributed Queue Dual Bus (DQDB) Metropolitan Area Network (MAN), which is available from the IEEE and which is incorporated herein by reference.)

To guarantee that isochronous data may be transported through a node at either the DS1 or DS3 data rates and with a constant delay, then, in accord with an aspect of the invention, table 105-1 may be replaced with a number of such tables, for example, 24 tables, as shown in FIG. 3. As a result of employing 24 tables (designated 105-2 through 105-25 in the Figure) a module that is adapted to process isochronous data at either the DS1 or DS3 rate, in accord with the aforementioned standard, will be granted access to the transmit bus for the appropriate number of time slots, as will be discussed below in detail. For the present, however, attention is briefly directed to FIG. 4, which illustrates a concept referred to herein as a bandwidth management period for meeting the transmission requirements defined by the aforementioned 802.6 standard.

Specifically, the bandwidth management period comprises a predetermined number of time frames—illustratively 24 time frames—with each such time frame consuming 125 microseconds which conforms with the timing of a so-called extended superframe. Thus, the bandwidth management period equals three milliseconds. In addition, in accord with an illustrative embodiment of the invention, transmit and broadcast busses 140 and 135 (FIG. 1) are arranged as multibit, parallel-lead busses each operative for transporting data at a predetermined transmission rate, for example, 200 Mb/s. That is, bus 140 (135) accommodates four bytes of data with each byte comprising eight bits plus overhead, such as parity bits.

Figure 4:
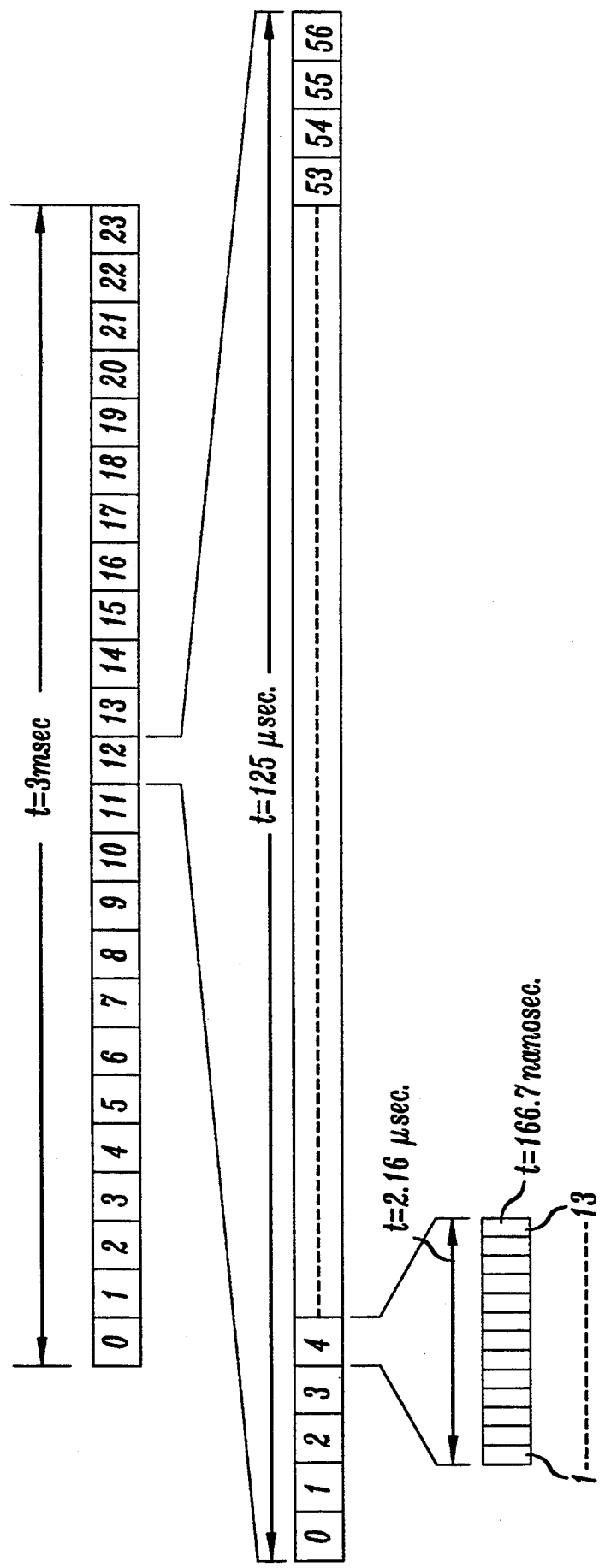
FIG. 4 illustrates the structure of a so-called bandwidth management period.

It is seen from the FIG. 4 that each time frame of the bandwidth management period comprises 57 time slots (as mentioned above). (The division of a time frame into 57 time slots is based on the transmission rate of bus 140 (135). It is to be understood of course, that a time frame may be divided into a greater or lesser number of time slots merely by increasing or decreasing the transmission rate of bus 135.)

It is also seen from the FIG. 4 that each time slot is divided into a number of segments—illustratively thirteen (13) segments, or subslots. In an illustrative embodiment of the invention, a module which has been granted access to transmit bus 140 is arranged to transmit during each of the thirteen segments of a time slot four bytes of data. Thus, a module 110 would transmit over transmit bus 140 during a time slot a packet comprising 53 bytes of data plus overhead, in which the format of the packet conforms with the aforementioned 802.6 standard. (Such a packet will also be referred to herein as an Asynchronous Transport Mode (ATM) segment.) The so-called payload of an ATM segment comprises a variable number of bytes, with the maximum number being 48 bytes. Thus, the number of segments of a time slot that a module uses is based on the number of bytes forming the payload of the ATM segment that the module is transmitting. Moreover, to achieve a DS1 (DS3) transmission rate, a module would have to transmit ten (288) ATM segments within a bandwidth management period.

With the foregoing in mind, we return to FIGS. 1 and 3. In the following discussion it is assumed that module 110-1 is arranged to process isochronous data at the DS1 rate. Therefore, module 110-1 would have to be guaranteed access to transmit bus 140 for at least ten (10) time slots within the bandwidth management period. This is achieved in accord with the invention by inserting the address assigned to module 110-1 (e.g. an address of one) in a least 10 of the fields of tables 105-2 through 105-25, which tables correspond with respective ones of the time frames forming the bandwidth management period. It seen from FIG. 3 that the module 110-1 address has been inserted in field zero of tables 105-2 through 105-11, thereby guaranteeing that module 110-1 will have exclusive access to transmit bus 140 during time slot zero (0) of each of the first ten frames of a bandwidth management period and, therefore, will be able to transmit to another module, e.g., module 110-20, an ATM segment during each such time slot. (It is noted that the ten slots assigned to module 110-1 do not have to be in any particular order, but could be randomly dispersed through out tables 105-2 through 105-25.)

Accordingly, then, clock module 105 would invoke in sequence each of the tables 105-2 though 105-25 in correspondence with respective ones of the time frames forming the current bandwidth management period. For example, clock module 105 would use table 105-2 to manage, in the manner discussed above, access to transmit bus 140 during time frame zero of the current bandwidth management period. Clock module 105 would then use table 105-3 during time frame one (1) of the latter period, and so on. In this way, module 110-1 would be granted access to transmit bus 140 during time slot 0 of first ten frames of the current bandwidth management period. At the beginning of the next such period clock module would repeat the bus management process beginning with table 105-2 and ending with table 105-25.

In the event that a module, e.g., module 110-15 which receives video images via path 254 for delivery to path 258 via module 110-N, is arranged to process data at the aforementioned DS3 rate, then, 288 fields of tables 105-2 through 105-25 would have to be assigned to module 110-15. As mentioned above, such assignments could be symmetrically or randomly ordered throughout tables 105-2 through 105-25. For example, a group of twelve (12) consecutive fields of each table 105-2 through 105-25 could be assigned to module 110-15, in the manner shown in FIG. 4. In that event, then, module 110-15 would be granted access to transmit bus 140 during 288 time slots of each bandwidth management period in order to transmit to module 110-N a like number of ATM segments.

The foregoing is merely illustrative of the principles of the invention. Those skilled in the art will be able to devise numerous arrangements, which, although not explicitly shown or described herein, nevertheless embody those principles that are within the spirit and scope of the invention.

I claim:

1. A method of arbitrating access to a transmit bus associated with a communications switch, said transmit bus being arranged for transmitting data packets between respective ones of a plurality of port modules connected to said transmit bus, said method comprising the steps of defining transmit bus time frames each comprising a plurality of time slots, associating said port modules with respective levels of priority, preassigning to at least one of said port modules, as a function of the level of priority associated with said at least one port module, a particular one of said time slots of respective ones of said frames, and transmitting over another bus, during a predetermined interval of a current one of said frames, an address identifying said at least one port module and granting to said at least one port module access to said transmit bus during said at least one time slot of said current frame if said at least one port module asserts its associated level of priority in response to the transmission of its address over said other bus.

2. The method set forth in claim 1 further comprising the step of using as said predetermined interval a time slot that next precedes said one time slot.

3. The method set forth in claim 2 further comprising the step of declaring said at least one time slot as an open contention period in the event that said at least one port module does not assert said highest level of priority, and, of the port modules who are asserting their respective levels of priority in response to said open contention, granting such access during said one time slot of the current frame to the port module that is asserting the relatively highest level of priority.

4. The method set forth in claim 2 further comprising the step of declaring said at least one time slot as an open contention period in the event that said at least one port module does not assert said highest level of priority and, of the port modules who are asserting their respective levels of priority in response to said open contention, granting to those of the port modules that are asserting the same relatively highest level of priority access to said transmit bus during respective succeeding ones of the open time slots of said current frame including said one time slot.

5. The method set forth in claim 4 wherein said step of declaring and granting includes the step of granting such access to the port modules asserting the same relatively highest level of priority based on the order of their respective addresses.

6. The method set forth in claim 5 wherein said step of declaring and granting further includes the step of preventing at least an individual one of said port modules from obtaining such access for more than a respective predetermined number of times.

7. The method set forth in claim 1 wherein said step of defining includes the step of operating said transmit bus in an asynchronous mode.

8. The method set forth in claim 1 further comprising the step of associating said port modules with respective data services including asynchronous and isochronous services, and wherein said highest level of priority is assigned to those of said port modules associated with said isochronous service, and lower levels of priority are assigned to those of said port modules associated with said asynchronous services, in which said isochronous and asynchronous services include connection oriented and connectionless services.

9. The method set forth in claim 8 wherein said at least one of said port modules is associated with said asynchronous and isochronous services, and wherein said method further comprises the step of arranging those of said port modules associated with said asynchronous service so that they contend for access to said transmit bus during open contention periods.

10. A method of arbitrating access to a transmit bus associated with a communications switch, said transmit bus being arranged for transmitting information packets between respective ones of a plurality of port modules connected to said transmit bus, said method comprising the steps of generating a stream of transmit bus time frames each comprising a plurality of time slots, associating said port modules with respective levels of priority such that at least one of said port modules is associated with the highest level of priority, preassigning at least a particular one of said time slots of each of said frames to said at least one of said port modules, and transmitting over another bus, during a predetermined time slot of a current one of said frames, an address identifying said at least one port module and, if said one of said port modules asserts said highest level of priority, then granting said one of said port modules access to said transmit bus during said at least one time slot of said current frame.

11. The method set forth in claim 10 wherein said predetermined time slot is a time slot that precedes said one time slot.

12. The method set forth in claim 11 further comprising the steps of declaring said at least one time slot as an open contention period in the event that said at least one port module does not assert said highest level of priority, and, responsive to a plurality of other ones of said port modules who are asserting their respective levels of priority in response to said open contention, granting such access during said one time slot of the current frame to that one of said other port modules that is asserting the relatively highest level of priority.

13. The method set forth in claim 11 further comprising the steps of declaring said at least one time slot as an open contention period in the event that said at least one port module does not assert said highest level of priority and, responsive to a plurality of other ones of said port modules who are asserting their respective levels of priority in response to said open contention, granting to those of said other port modules that are asserting the same relatively highest level of priority access to said transmit bus during respective succeeding ones of the open time slots of said current frame including said one time slot.

14. The the method set forth in claim 13 further comprising the step of granting such access to said port modules asserting the same relatively highest level of priority based on the order of their respective addresses.

15. The method set forth in claim 14 further comprising the step of preventing at least an individual one of said port modules from obtaining such access for more than a respective predetermined number of times.

16. The method set forth in claim 10 wherein said step of generating includes the step of operating said transmit bus in an asynchronous mode.

17. The method set forth in claim 10 further comprising step of associating said port modules with respective data services including asynchronous and isochronous information services, and wherein said highest level of priority is assigned to those of said port modules associated with said isochronous service, and lower levels of priority are assigned to those of said port modules associated with said asynchronous services, in which said asynchronous and isochronous services may include connection oriented and/or connectionless services.

18. The method set forth in claim 17 wherein said at least one of said port modules is associated with said asynchronous and isochronous information services, and wherein said method further comprises the step of arranging those of said port modules associated with said asynchronous service so that they contend for access to said transmit bus during open contention periods.

19. The method set forth in claim 18 wherein said isochronous services include DS1 data rates.

20. The method set forth in claim 18 wherein said isochronous services include DS3 data rates.

21. A method of arbitrating access to a transmit bus associated with a communications switch, said transmit bus being arranged for transmitting information packets between respective ones of a plurality of port modules connected to said transmit bus, said method comprising the steps of generating a stream of transmit bus time frames each comprising a plurality of time slots, preassigning particular ones of the time slots of individual ones of said frames to respective ones of said port modules, and transmitting over another bus, during a time slot preceding a preassigned one of said time slots, an address associated with one of said port modules and granting access to said transmit bus during said preassigned time slot to said one port module if said one port module asserts during said preceding time slot a request to access said transmit bus.

* * * * *